United States Patent [19]

Kluger

[11] Patent Number: 5,090,745
[45] Date of Patent: Feb. 25, 1992

[54] QUICK-CONNECT CONNECTOR FOR PLASTIC TUBES

[75] Inventor: Edward F. Kluger, Attica, Mich.

[73] Assignee: ITT Corporation, New York, N.Y.

[21] Appl. No.: 572,201

[22] Filed: Aug. 23, 1990

[51] Int. Cl.⁵ .............................................. F16L 55/00
[52] U.S. Cl. ............................ 285/187; 285/382.4; 285/423
[58] Field of Search ............ 285/239, 282.4, 382, 285/423, 45, 187, 242; 29/450

[56] References Cited

U.S. PATENT DOCUMENTS

| | | | |
|---|---|---|---|
| 683,342 | 9/1901 | Sherman | 285/239 X |
| 2,315,225 | 3/1943 | Rogers | 285/239 |
| 3,262,721 | 7/1966 | Knight | 285/242 X |
| 3,565,116 | 2/1971 | Gabin | 285/45 |
| 3,759,445 | 9/1973 | King | 285/239 X |
| 3,784,236 | 1/1974 | Slocum | 285/45 |
| 4,486,034 | 12/1984 | Sauer | 285/242 |
| 4,703,957 | 11/1987 | Blenkush | 285/239 |
| 4,929,236 | 5/1990 | Sampson | 285/239 X |
| 4,932,689 | 6/1990 | Bradley | 285/423 X |

FOREIGN PATENT DOCUMENTS 0369834  5/1990  European Pat. Off. ............ 285/239

Primary Examiner—Randolph A. Reese
Assistant Examiner—Heather Chun
Attorney, Agent, or Firm—Robert P. Seitter; J. Gordon Lewis

[57] ABSTRACT

A plastic quick-connect connector for connecting a plastic tube or fluid line to a connector stem. A elastically expandable plastic compression sleeve is slid over the end of the mating plastic tube or fluid line. The connector stem receives the plastic tube and surrounding compression sleeve the stem to expand the plastic tube and the tightly surrounding compression sleeve radially outwardly into a gripping relationship with the stem therebetween. The compression sleeve is of a material which is does not relax at elevated temperatures on the order of 350° F. This arrangement prevents creep or relaxation of the plastic tube or fluid line which, in turn, prevents an undesired pull-off, or separation of the completed connection.

6 Claims, 1 Drawing Sheet

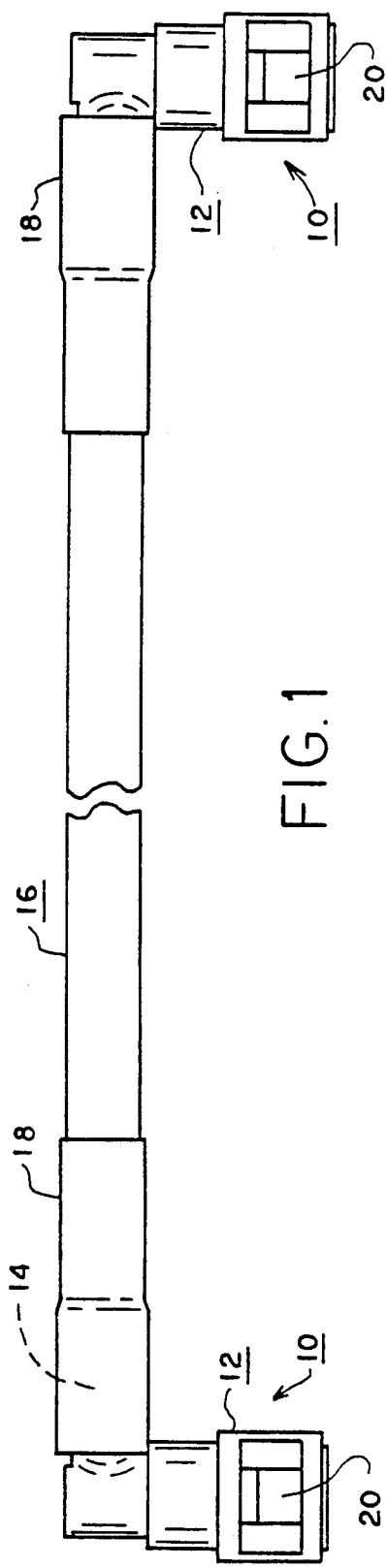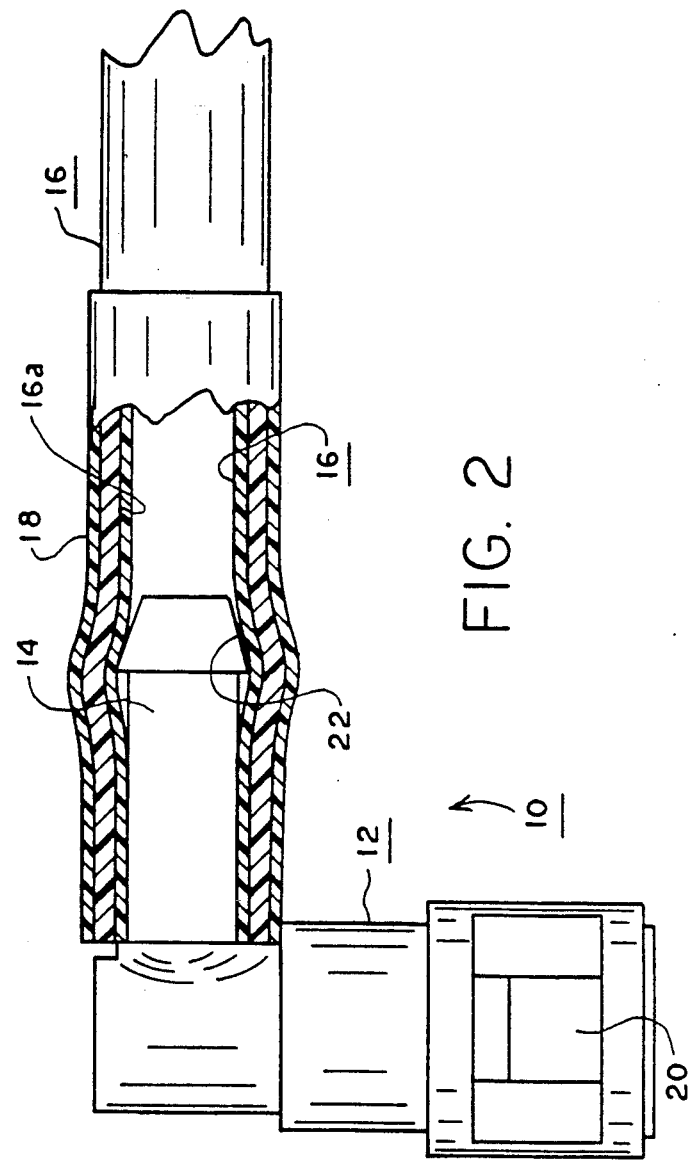

QUICK-CONNECT CONNECTOR FOR PLASTIC TUBES

BACKGROUND OF THE INVENTION

This invention relates to a plastic quick-connect connector for connecting a flexible tube or fluid line to a connector termination such as a fluid or fuel line and, more particularly, to such a plastic connector which maintains its connection with the associated plastic tube even at elevated temperatures which otherwise would result in relaxation of the plastic tube and therefore an undesired disconnection of the completed connection.

Quick-connect connector devices are known and have been widely used in the art. In these devices, the stem of the connector body, which is typically of steel, is forced into the associated flexible fluid tube and the resulting tight engagement between ridges on the stem of the tube and the fluid line is relied upon to hold them together. To ensure such connections, steel bands typically are provided around the end portions of the flexible tubes so as to maintain the dimensional stability of the plastic tube at elevated temperatures such as the temperatures encountered in automotive applications. Nevertheless, it has been found that at these elevated temperatures, the underlying plastic tube loosens or relaxes to such an extent that the plastic tube pulls off or "pops-out" of the connection with the connector body. Further, since the quick-connect connector body typically is made of a rigid metallic material such as steel, the manufacturing limitations are such that the extending or protruding stem which is intended to mate with or to be inserted into the associated plastic tube must be coaxial and in line with the central axis of the connector body. That is, the manufacturing techniques for such steel quick-connect connector bodies are so limited that advantageous orientations of the stem such as a transverse or 90° relationship to the central axis of the connector body are not readily achievable. Thus, these known devices have not achieved the desired industry requirements of the desired variety of angular connector configurations and of maintaining the grip strength and connection integrity particularly at elevated temperatures—which temperatures can rise to 350° F. and in some cases as high as 375°–400° F., and which temperatures are not uncommon in these applications.

These and other disadvantages are overcome by the present invention wherein a quick-connect connector is provided for connecting the plastic tube or fluid line to a connector connection such as a fluid or fuel line wherein the mechanical and fluid-tight requirements are maintained even at elevated temperatures in the range of 350° to 400° F. Further, by providing a plastic body such as a so-called "Teflon" crosshead, a plurality of angular relationships between the connector body and the interconnecting stem, such as a 90° orientation, readily can be provided.

SUMMARY OF THE INVENTION

Briefly, a connector for terminating a plastic tube into a utilization connection is provided. A connector body having a termination end for operative coupling the body with a utilization device and having a connection stem extending from the other end of the body is provided. A plastic tube having a generally circular, open cross-section at an end portion thereof is provided for mating with the connector body. A limited length of a readily expandable plastic compression sleeve coaxially surrounds the end portion of the plastic tube and axially extends a predetermined limited distance along the plastic tube. The stem is inserted into the coaxial end configuration of the plastic tube and the compression sleeve to expand the inside diameters of the plastic tube and the compression sleeve into tight engagement therebetween and circumferentially around the stem inserted therein. The compression sleeve is constructed of a material that remains unaffected by relatively elevated temperatures on the order of 350° F. so as to continue to grip the plastic tube, the plastic tube thus dimensionally stabilized at the elevated temperature.

BRIEF DESCRIPTION OF THE DRAWING

The advantages of this invention will become more readily appreciated as the same becomes completely understood by reference to the following detailed description when taken in conjunction with the accompanying drawing wherein:

FIG. 1 is a plan view of a double-ended quick-connect connector configuration of a typical plastic tube or fluid line with corresponding end connectors adapted for connection to an external utilization device or devices; and, FIG. 2 is an enlarged view in partial cross section illustrating the relationship of the extending stem of the quick-connect connector body with the associated plastic tube or fluid line and illustrating the compression sleeve in accordance with the principles of the present invention.

DETAILED DESCRIPTION

Referring now to FIG. 1 there is shown a plan view of a completed, double-ended connection of the quick-connect connector, in accordance with the present invention, terminated to a typical plastic tube or fluid line. Connector 10 includes a connector body 12 having a transversely extending stem 14, as best shown in FIG. 2, which is inserted into the coaxial arrangement of plastic tube 16 and a compression sleeve 18. It can be seen that stem 14 causes a radially outwardly extending expansion of compression sleeve 18 and plastic tube 16 coaxially disposed therein. Connector body 12 basically is of a conventional configuration wherein tabs 20 are provided on the termination portion thereof. Tabs 20 are radially inwardly deflectable so as to engage the bead of a plastic or metallic tube inserted into the termination end of the body 12 to retain the external tube therein. A suitable annular O-ring or rings (not shown) are provided within the central bore along the central axis of body 12 so as to engage the forward end of the inserted tube in sealing relationship therewith, as is known in the art.

As is best illustrated in FIG. 2, plastic tube 16 includes a protective outer covering of plastic or elastomeric material 16a which typically is provided to add additional physical protection to plastic tube 16 from abrasion and physical damage in applications such as in the brake line or air conditioning system of an automotive vehicle.

Referring now to FIG. 2 there is shown, in somewhat greater detail, an enlarged view of one of the connectors 20 of FIG. 1 including a partial cross-sectional view of the relationship between the stem 14 of connector body 20, plastic tube 16, its protective covering 16a, and compression sleeve 18. It can be seen that stem 14 of connector body 20 includes at least one annular ridge or barb 22 which, in the illustration of FIG. 2, tapers radially inwardly toward the end portion of the stem 14. In actual practice, compression sleeve 18 is inserted over the open or confronting end of the coaxial arrangement of plastic tube 16 and its protective rubber cover 16a until the end portions of the three members are flush with one another. Thereafter, stem 14 of connector body 14 is forced into the tri-coaxial arrangement of the three plastic or elastomeric members 16, 16a and 18 whereupon the inside diameters of those members are elastically expanded radially outwardly into a tight mechanical and fluid-tight relationship therebetween and with stem 14, thereby to provide the desired fluid-tight connection. At this point, connector body 20 is snapped into or otherwise engaged with its utilization device such as the beaded end of a fluid line or a nipple-like connection on the body of a fluid or air carrying device.

In accordance with the principles of the present invention, the arrangement provided in accordance with the previous description provides not only the desired initial connection but also provides a connection which withstands the elevated temperatures which commonly are encountered in typical applications of quick-connector devices, such as automobiles, refrigeration equipment and the like. That is, the compression sleeve or band 18 is provided of a material that does not relax to the same extent as the fluid line 16 (and, if utilized, its protective covering 16a). This arrangement prevents relaxation of the plastic fluid line and keeps the joint assembled even at high temperatures. In the known devices, at high temperatures, that is, at temperatures greater than 350° F., the plastic materials relax and the quick connect device "pops-up" or "pops-out" and otherwise fails to meet the "pull-off" strength requirements required or at least desired in the industry. It has been found that the quick-connect connector of the present invention retains its grip strength and does not relax and its holding tension does not relax, even at temperatures in the 375° to 400° F. application range. Further, the need for a crimped metal band round the end portion of the plastic tube, or such a plastic tube which is coaxially surrounded by a stainless steel braid material, is avoided by the quick-connect connector device in accordance with the teachings of the present invention. In this regard, the grip strength and pull-off resistance is attributable to the use of the compression sleeve which is selected of a material which avoids relaxation relative to that of the underlying plastic tube even at elevated ambient temperatures.

On one embodiment, the material of compression sleeve 18 comprised PPE nylon blend as manufactured by Allied Chemical and which is poly-phenalic ether. The material of connector body 12 comprised a filled Nylon-12 for its manufacturing advantages as previously discussed. However, it should be appreciated that in many applications, connector body 12 can be made of steel as in conventional manufacturing processes. However, as previously discussed, in order to achieve a multiplicity of connector body configurations to meet given applications, a plastic body is preferred. For example, a plastic body advantageously provides the ability to provide a transversely extending stem 14 which may extend at an angle of approximately 90° with respect to the central longitudinal axis of connector body 12. This provides the designer and the OEM supplier much greater flexibility to meet the needs of a given customer application. Further, the use of the compression sleeve 18, in accordance with the present invention, not only maintains the desired connection at elevated temperatures, but also overcomes the creep problem which would result with the use of a plastic tube without the compression sleeve of the present invention. This creep "sets" and remains even when the environment returns to lower temperature ranges. That is, the use of a plastic tube, such as Teflon, by itself undesirably would result in a creep at elevated temperatures which, even if the initial creep essentially at any temperature and particularly did not result in an undesired pull-off of the connection, would be retained or memorized after the temperatures return to more moderate levels.

In any event, the compression sleeve 18 provides and maintains the desired gripping and gripping strength and does not relax or lose its tension at elevated temperatures. The compression sleeve 18 also maintains the desired compressive relationship when the ambient temperature returns to more moderate levels. In actual practice, the outer protective tube 16a typically comprises TPR or thermal plastic rubber. Further, it is also contemplated that there will be applications where rather than using a TPR or elastic material for protective tube 16a, a metallic braid material, such as stainless steel, will be used in order to provide an armored protective measure against abrasion and misuse in a given application.

What has been taught, then, is a securing method and device for hose constructions facilitating, notably, a quick-connect connector for plastic tubes which overcomes the disadvantages of the prior art. The form of the invention illustrated and described herein is but a preferred embodiment of these teachings. It is shown as an illustration of the inventive concepts, however, rather than by way of limitation, and it is pointed out that various modifications and alterations may be indulged in within the scope of the appended claims.

What is claimed is:

1. A connector assembly for terminating a plastic tube into a utilization connection, comprising, in combination:

a connector body having a central axis and a termination end for operatively coupling said body with a utilization device and having a connection stem extending from the other end of said body;

an elastic, readily expandable plastic tube having an inside diameter smaller than said connection stem, said plastic tube having an end portion received over said connection stem and elastically expanded thereby to be tightly fit to said connection stem; said plastic tube constructed of a material which relaxes at elevated temperatures on the order of 350° F.;

an elastic, readily expandable plastic compression sleeve fitted over said end portion of said plastic tube and axially extending a predetermined limited distance along said plastic tube, said plastic compression sleeve also elastically expanded by said connection stem being received in said end portion of said plastic tube to exert a compressive pressure on said plastic tube end portion;

said compression sleeve constructed of a material which does not relax at temperatures on the order of 350° F. so as to continue to exert said compressive pressure on said plastic tube at said elevated temperatures, whereby said plastic compression sleeve insures that said plastic tube remains in gripping relationship with said connection stem at said elevated temperatures.

2. The connector according to claim 1 wherein said connection stem includes at least one annular ridge at its end portion thereof for engaging the inside diameter of said plastic tube.

3. The connector according to claim 2 wherein the axial length of said compression sleeve is at least as great as the length of said connection stem.

4. The connector according to claim 3, wherein said annular ridge is a barb which tapers radially inwardly in the direction into said plastic tube.

5. The connector according to claim 1, wherein said connector body is of a plastic material.

6. The connector according to claim 1, wherein a protective elastomeric sleeve is coaxially provided around said plastic tube, having an end portion of which coaxially disposed between said plastic tube and said compression sleeve.

* * * * *